United States Patent [19]

Sugamo et al.

[11] Patent Number: 5,882,394
[45] Date of Patent: Mar. 16, 1999

[54] AQUEOUS PIGMENT PASTE FOR OFFSET INK, PROCESS FOR PRODUCING THE PASTE, AND USE THEREOF

[75] Inventors: Hitoshi Sugamo; Hiroki Nishina; Seiji Aida, all of Tokyo, Japan

[73] Assignee: Toyo Ink Manufacturing Co., Ltd., Tokyo, Japan

[21] Appl. No.: 817,760

[22] PCT Filed: Jun. 28, 1995

[86] PCT No.: PCT/JP95/01284

§ 371 Date: Aug. 27, 1997

§ 102(e) Date: Aug. 27, 1997

[87] PCT Pub. No.: WO97/01607

PCT Pub. Date: Jan. 16, 1997

[51] Int. Cl.$^6$ ..................................................... C09B 63/00
[52] U.S. Cl. .................. 106/402; 106/31.72; 106/31.73; 106/31.75; 106/31.79; 106/31.8; 106/31.81; 106/496; 106/500
[58] Field of Search ..................... 106/402, 496, 106/500, 31.72, 31.73, 31.75, 31.79, 31.8, 31.81

[56] References Cited

U.S. PATENT DOCUMENTS

| | | | |
|---|---|---|---|
| 3,560,235 | 2/1971 | Sarfas et al. | 106/402 |
| 3,582,380 | 6/1971 | Hamilton | 106/402 |
| 4,177,674 | 12/1979 | Ando et al. | 106/402 |
| 5,144,014 | 9/1992 | Sugamo et al. | 106/496 |
| 5,151,129 | 9/1992 | Morrison et al. | 106/496 |
| 5,190,585 | 3/1993 | McCrae et al. | 106/496 |
| 5,243,031 | 9/1993 | Sugamo et al. | 106/496 |

*Primary Examiner*—Mark L. Bell
*Assistant Examiner*—Scott L. Hertzog
*Attorney, Agent, or Firm*—Wenderoth, Lind & Ponack L.L.P.

[57] ABSTRACT

The present invention relates to a aqueous pigment paste for an offset ink, which paste is suitable for producing an offset ink by a flushing method, a process for the production of the aqueous pigment paste, and an offset ink obtained by a flushing method. The aqueous pigment paste for an offset ink contains a lake pigment of an azo dye obtained by coupling a diazonium salt of an aromatic amine having a soluble group and a coupler component, 3 to 15% by weight, based on the azo dye, of a rosin, 1 to 20% by weight, based on the azo dye, of a vehicle for an offset ink, the total amount of the lake pigment, the rosin and the vehicle being 10 to 40% by weight, and 60 to 90% by weight of water.

8 Claims, No Drawings

AQUEOUS PIGMENT PASTE FOR OFFSET INK, PROCESS FOR PRODUCING THE PASTE, AND USE THEREOF

TECHNICAL FIELD

The present invention relates to an aqueous paste of a monoazo lake pigment useful for an offset printing ink, a process for the production thereof, and an offset ink containing the same. More specifically, it relates to an aqueous paste of a monoazo lake pigment improved in flushing suitability, fluidity, clearness, gloss and freedom from bronze, a process for the production thereof, and an offset ink containing it.

TECHNICAL BACKGROUND

A monoazo lake pigment obtained by coupling an aromatic amine having a soluble group as a diazo component and β-hydroxynaphthoic acid or β-naphthol as a coupler component is widely used in the fields of printing inks, coating compositions and coloring of plastics. The monoazo lake pigment has been treated with a rosin for obtaining transparency and clearness in color tone and improving the dispersibility thereof. The rosin treatment is generally carried out by adding an alkali salt solution of a rosin (so-called "rosin soap") to a coupler component or a dye, and then adding a metal salt for a lake such as calcium chloride to precipitate the rosin on the surface of each pigment particle in the form of a rosin lake metal salt.

The above rosin treatment controls the pigment particles so as to have a fine particle size and improves the transparency and clearness of the pigment. Moreover, the rosin treatment has excellent effects that it as a coating prevents the coagulation of the pigment and that it improves the dispersibility of the pigment. However, it cannot be said that any conventional rosin treatment exhibits its full effects. In a pigment for an offset ink in particular, the amount of a rosin for improving the dispersibility is large. The use of the rosin in a large amount causes many problems such as a decrease in fluidity or a decrease in printing suitability caused by poor water resistance. Further, when the amount of the rosin is decreased, there are caused such problems as a decrease in transparency and clearness, an increase in bronze and a decrease in flushing compatibility.

It has been therefore desired to develop a surface treatment technique for effectively coating the pigment and to develop a monoazo lake pigment improved in flushing suitability, fluidity, clearness, gloss and freedom from bronze.

It is therefore an object of the present invention to provide an aqueous paste of a monoazo lake pigment, which can decrease the amount of the rosin so that the flushing time length can be decreased and that an exhausted water is less colored, and which is excellent in fluidity, clearness, gloss and freedom from bronze and also excellent in the suitability for offset printing, a process for the production thereof, and an offset ink.

DISCLOSURE OF THE INVENTION

The present invention provides a aqueous pigment paste for an offset ink, which contains a lake pigment of an azo dye obtained by coupling a diazonium salt of an aromatic amine having a soluble group and a coupler component, 3 to 15% by weight, based on the azo dye, of a rosin, 1 to 20% by weight, based on the azo dye, of a vehicle for an offset ink and 60 to 90% by weight, based on an entire composition, of water.

Further, the present invention provides a process for the production of a aqueous pigment paste for an offset ink, which comprises the steps of coupling a diazonium salt of an aromatic amine having a soluble group and a coupler component to obtain an azo dye, lake-forming the obtained azo dye in the presence of a rosin to obtain a slurry of a monoazo lake pigment, adding a vehicle for an offset ink to the obtained slurry of a monoazo lake pigment, and concentrating the slurry of a monoazo lake pigment obtained in the preceding step to produce the aqueous pigment paste for an offset ink.

Further, the present invention provides an offset ink obtained by flushing the above-obtained aqueous pigment paste for an offset ink with a vehicle for an offset ink, and a process for the production of the above offset ink.

PREFERRED EMBODIMENTS FOR WORKING THE INVENTION

In the present invention, the monoazo lake pigment refers to a pigment obtained by coupling a diazo component prepared by diazotizing an aromatic amine having a soluble group and a coupler component to obtain a dye and forming the dye into a lake.

In the present invention, examples of the aromatic amine having a soluble group are as follows. 1-Amino-4-methylbenzene-2-sulfonic acid (p-toluidine-m-sulfonic acid), 1-amino-4-methyl-5-chlorobenzene-2-sulfonic acid, 1-amino-4-chloro-5-methylbenzene-2-sulfonic acid, 1-amino-4-methylbenzene-3-sulfonic acid, 2-aminonaphthalene-1-sulfonic acid, 1-amino-3-methylbenzene-4-sulfonic acid, and the like.

The coupler component is typically β-hydroxynaphthoic acid, while it may be selected from β-naphthol or acetoacetoanilide. Further, the coupler component may be selected from derivatives of the above coupler components such as compounds substituted with a lower alkyl group, an alkoxy group or a halogen atom.

In the present invention, the monoazo lake pigment can be produced according to a known method of producing a monoazo lake pigment. That is, the aromatic amine having a soluble group is diazotized by a conventional method, and on the other hand, the above coupler component is prepared by a conventional method. These two components are coupled by a conventional method, and the resultant dye is formed into a lake with a metal used for forming a pigment lake. Further, a metal used for forming a pigment lake may be added to the diazo component in advance, and the mixture may be used for the coupling. Examples of the metal used for forming a pigment lake include calcium, barium, strontium, manganese, etc.

The rosin is prepared in the form of a soluble salt such as a sodium salt, a potassium salt, an ammonium salt or the like and added to the dye or the coupler component in advance so that it is present during the lake formation.

The aqueous pigment paste in the present invention has a characteristic feature in which a vehicle for an offset ink is incorporated into a slurry of a lake-formed pigment. Preferably, a generally used vehicle for an offset ink, which vehicle is composed of a resin, a solvent for an ink, etc., is further diluted with a solvent and incorporated.

Examples of the resin for an ink include a rosin-modified phenolic resin and an alkyd resin. Of these, a rosin-modified phenolic resin is preferred. The vehicle for an offset ink, used in the present invention, contains 20 to 50% by weight of a resin such as a rosin-modified phenolic resin, or the like, 0 to 30% by weight of a plant oil such as linseed oil, tung oil or soybean oil, and 10 to 60% by weight of a solvent such as n-paraffin, isoparaffin, aromatic, naphthene or α-olefin. The solvent preferably has a boiling point approximately in the range of 270° to 320° C.

Examples of the rosin-modified phenolic resin are as follows.

(a) A rosin-modified phenolic resin obtained by dissolving P-alkylphenol, paraformaldehyde and a rosin in toluene, allowing them to react in the presence of an acid or alkali catalyst and esterifying the reaction product with a polyol. The P-alkylphenol includes P-octylphenol and P-nonylphenol. The polyol includes glycerin and pentaerythritol.

(b) A rosin-modified phenolic resin obtained by melting a rosin at 200° C., adding and reacting a resol resin to/with the rosin and esterifying the reaction product with glycerin.

(c) A rosin-modified phenolic resin obtained by adding and reacting a resol resin to/with a glycerin ester of a rosin.

(d) A rosin-modified phenolic resin obtained by reacting a rosin-modified alkyd resin with a phenolic resin.

The solvent for diluting the vehicle for an offset ink includes No. 0 solvent, No. 5 solvent, No. 7 solvent, etc. (supplied by Nippon Oil Co., Ltd.). These solvents are those which are generally used as a solvent in a vehicle for an offset ink.

In the aqueous pigment paste for an offset ink, the amount of the vehicle for an offset ink based on the azo dye is 1 to 20% by weight, preferably 5 to 15% by weight. When the amount of the vehicle for an offset ink is less than the above lower limit, the aqueous pigment paste is poor in flushing suitability, and the offset ink is consequently poor in fluidity and clearness. When the amount of the vehicle exceeds the above upper limit, the resultant aqueous pigment paste shows a sticking nature so that it is poor in handling properties.

Further, the amount of the rosin based on the azo dye is 3 to 15% by weight, preferably 6 to 12% by weight. When the amount of the rosin is less than the above lower limit, particles of the pigment undergo crystal growth when the pigment is formed into a lake, and the pigment has increased particle diameters so that the pigment concentration decreases. When the amount of the rosin exceeds the above upper limit, the suitability of the offset ink for emulsification with damping water decreases when offset printing is conducted. That is, the printing suitability decreases.

The aqueous pigment paste for an offset ink is adjusted to have a water content of 60 to 90% by weight.

The method of adding the vehicle for an offset ink to the lake pigment is preferably carried out as follows. The vehicle for an offset ink is dissolved or dispersed in the solvent for an offset ink at a temperature in the range of from 10° to 50° C. with stirring, and the resultant solution or suspension is added to the lake-formed pigment slurry at a temperature in the range of from 10° to 90° C. The vehicle for an offset ink is preferably diluted with a solvent for an offset ink before use. More specifically, 20 parts by weight of a linseed oil and 30 parts by weight of a No. 5 solvent (solvent for an offset ink, supplied by Nippon Oil Co., Ltd.) are added to 50 parts by weight of Tamanol (rosin-modified phenolic resin, supplied by Arakawa Chemical Industries, Inc.). The vehicle dissolved under heat at 200° C. is suspended in a No. 5 solvent (supplied by Nippon Oil Co., Ltd.) which is a solvent for an offset ink. Then, the resultant suspension is added to the lake-formed pigment slurry, and the pigment is concentrated by means of filtration, etc.

The amount of the solvent for diluting the vehicle for an offset ink is 1 to 20% by weight, preferably 5 to 15% by weight, based on the azo dye (to be sometimes referred to as "dyestuff" thereinafter), and the amount of the above solvent based on the vehicle for an offset ink is 1 to 300% by weight, preferably 50 to 200% by weight. The vehicle is diluted with the solvent for increasing the fluidity of the vehicle for an offset ink so that the contact of the vehicle to the pigment slurry is facilitated. The diluting solvent may be the same as, or may be different from, the solvent used in the vehicle for an offset ink.

The above-prepared aqueous pigment paste for an offset ink is treated by a flushing method to produce an offset ink. That is, the aqueous pigment paste for an offset ink is added to the vehicle for an offset ink, and the mixture is flushed. Examples of the vehicle for an offset ink are as follows.

A vehicle containing 20 to 50% by weight of a resin such as a rosin-modified phenolic resin, a petroleum resin, an alkyd resin or a dry oil-modified resin of any one of these, 0 to 30% by weight of a plant oil such as linseed oil, tung oil or soybean oil, and 10 to 60% by weight of a solvent such as n-paraffin, isoparaffin, aromatic, naphthene or α-olefin. Further, various known additives for an ink, such as other ink solvent, a dryer, a leveling improver, etc., are added to form an offset printing ink composition.

The present invention will be explained more in detail with reference to Examples hereinafter, in which "part" stands for "part by weight" and "%" stands for "% by weight" unless otherwise specified.

EXAMPLE 1

90.6 Parts of 1-amino-4-methylbenzene, 2.9 parts of 1-amino-4-methylbenzene-3-sulfonic acid and 1.8 parts of 2-aminonaphthalene-1-sulfonic acid were added to a solution containing 1,500 parts of water and 20 parts of sodium hydroxide. To the mixture was added 124 parts of 35% hydrochloric acid, to carry out acid-salting. Then, 1,000 parts of ice was added, and the mixture was cooled to 0° C. A solution containing 100 parts of water and 35 parts of sodium nitrite was added, and the mixture was stirred at 3° C. or lower for 30 minutes, to give a diazo component.

95 Parts of β-hydroxynaphthoic acid was added to a solution containing 3,000 parts of water and 51 parts of sodium hydroxide, and the mixture was cooled to 15° C. and used as a coupler component. The diazo component was dropwise added to the coupler component over 20-minute period to proceed with a coupling reaction, and the mixture was stirred for 30 minutes to give an azo dye. Then, 84.8 parts of a 25% rosin soap (resin solid content of 10% based on the dye) was added, and the mixture was adjusted to a pH of 11.5 with 1% sodium hydroxide. To this was added 300 parts of a 35% calcium chloride aqueous solution, and the mixture was continuously stirred for 1 hour to complete a lake-forming reaction. A solution was prepared by stirring and dispersing 21.2 parts (10% based on the dyestuff) of a vehicle for an offset ink synthesized from 50 parts of Tamanol 361, 20 parts of linseed oil and 30 parts of No. 5 solvent at 200° C. and 21.2 parts (10% based on the dyestuff) of No. 5 solvent at 20° C., and the solution was added to the lake-formed slurry over 20-minute period. The resultant mixture had a pH of 11.0. The mixture was heated to 70° C., then filtered and washed with water to give a monoazo lake pigment having a pigment content of 254 parts in an aqueous paste state (pigment content 27.5%, water content 72.5%). The pigment content was composed of 212 parts of the dyestuff, 21.1 parts (10% based on the dyestuff) of a rosin and 21.2 parts (10% based on the dyestuff) of the vehicle.

COMPARATIVE EXAMPLE 1

Example 1 was repeated except that a suspension of the vehicle for an offset ink and the solvent for an offset ink was not added to the lake-formed pigment slurry. That is, the lake-formed pigment slurry was heated to 70° C., filtered and washed with water to give a monoazo lake pigment in an aqueous paste state (pigment content 27.0%, water content 73.0%).

COMPARATIVE EXAMPLE 2

A monoazo lake pigment in an aqueous paste state (pigment content 27.0%, water content 73.0%) was obtained in the same manner as in Comparative Example 1 except that the amount of the 25% rosin soap to be added to the azo dye was changed from 84.8 parts to 169.6 parts (20% based on the dyestuff).

Offset ink test

Offsets inks containing the pigment obtained in Example 1 or Comparative Example 1 or 2 were tested. 20 Parts of linseed oil and 30 parts of No. 5 solvent (solvent for an ink, supplied by Nippon Oil Co., Ltd.) were added to 50 parts of Tamanol 361 (rosin-modified phenolic resin, supplied by Arakawa Chemical Industries, Inc.), and the mixture was heated to 200° C. to dissolve them. A vehicle for an offset ink was prepared by adding 2 parts of aluminum octylate to 98 parts of the resultant vehicle, to carry out the following tests.

(Suitability for flushing)

200 Grams of the vehicle for an offset ink was placed in a test flusher having a volume of 1 liter, and adjusted to 60° C. Then, an aqueous paste having a pigment content of 106 g was added, and the mixture was stirred. The flushing of the pigment obtained in Comparative Example 1 ended in 16 minutes, and the flushing of the pigment obtained in Comparative Example 2 ended in 14 minutes. The flushing of the pigment obtained in Example 1 ended in 11 minutes. The flushing exhaust from the pigment obtained in Example 1 showed a smallest degree of pigmentation, and the flushing exhausts from the other pigments showed large degrees of pigmentation. These results means that the treatment of a pigment with the vehicle for an offset ink improved the wettability of the pigment to the vehicle for an offset ink. After the removal of the exhaust, 84 g of the vehicle for an offset ink was added, and the mixture was stirred under heat at 110° C. under reduced pressure at 70 mmHg to remove water contained in the ink and crystal water contained in the pigment. The residue was cooled, and then, 110.5 parts of the vehicle for an offset ink and 78.5 g of an ink solvent (No. 5 solvent) were added. The mixture was kneaded and dispersed with a three-roll mill, and the resultant ink was adjusted to a tackiness of 7.0 by adding the vehicle for an offset ink and the ink solvent (No. 5 solvent) in a total amount of 45 g.

(Fluidity)

The fluidity was digitized as a 60-second value (radius) with a spread meter. The pigment obtained in Comparative Example 1 showed a fluidity of 19.2, and the pigment obtained in Comparative Example 2 showed a fluidity of 18.4, while the pigment obtained in Example 1 showed an excellent fluidity, as high as 19.8.

(Clearness)

0.2 Gram of a full shade ink was mixed with 5.0 g of a white ink (prepared by dispersing titanium oxide in the above vehicle) to prepare a tinting shade ink. The tinting shade ink was measured for a color with a color machine (Σ80, supplied by Nippon Denshoku) to determine a Munsell C value. The tinting shade ink from the pigment obtained in Comparative Example 1 showed a Munsell C value of 12.12, and the tinting shade ink from the pigment obtained in Comparative Example 2 showed a Munsell C value of 12.55, while the tinting shade ink from the pigment obtained in Example 1 showed a Munsell C value of 12.32. When the values of the tinting shade inks from the pigments obtained in Comparative Example 1 and Example 1, it is seen that the treatment with the vehicle improved the clearness even if the amounts of the rosin were the same.

(Test on offset printing suitability)

There was prepared ink extract water containing a water-soluble content obtained by emulsifying an ink in water, and the water was measured for a surface tension. The pigment obtained in Comparative Example 1 showed a surface tension of 61.5 dyne/cm, and the pigment obtained in Comparative Example 2 showed a decreased surface tension of 56.7 dye/cm, while the pigment obtained in Example 1 showed a surface tension of 61.5 dye/cm, which was not different from that of the pigment in Comparative Example 1. It is therefore assumed that the treatment of a lake pigment with the vehicle for an offset ink has no adverse effect on the offset printing suitability.

(Gloss test and visual bronze)

A full-shade ink was color-spread on an art paper sheet and measured for a gloss with an IR tester (supplied by Suga Testing Machines; 60° gloss). A sample from Comparative Example 1 showed a gloss of 74.5%, and a sample from Comparative Example 2 showed a gloss of 72.9, while a sample from Example 1 showed a highest gloss, as high as 78.3%. When these three samples were visually observed, the pigment obtained in Example 1 showed a smallest bronze.

INDUSTRIAL UTILITY

According to the present invention, there are provided an aqueous paste of a monoazo lake pigment improved in the wettability to an offset ink vehicle and improved in flushing suitability, fluidity, clearness, gloss and freedom from bronze, a process for the production thereof and an offset ink containing the same, by the novel surface treatment method in which the amount of rosin is minimized and sufficient.

We claim:

1. A aqueous pigment paste for an offset ink, which contains a lake pigment of an azo dye obtained by coupling a diazonium salt of an aromatic amine having a soluble group and a coupler component, 3 to 15% by weight, based on the azo dye, of a rosin, 1 to 20% by weight, based on the azo dye, of a vehicle for an offset ink, the total amount of the lake pigment, the rosin and the vehicle being 10 to 40% by weight, and 60 to 90% by weight of water.

2. A aqueous pigment paste for an offset ink according to claim 1, wherein the vehicle for an offset ink contains 20 to 50% by weight of a resin, 0 to 30% by weight of a plant oil and 10 to 60% by weight of a solvent.

3. A aqueous pigment paste for an offset ink according to claim 2, wherein the resin is at least one member selected from the group consisting of a rosin-modified phenolic resin, an alkyd resin, a petroleum resin and dry oil-modified resins of these.

4. A aqueous pigment paste for an offset ink according to claim 2, wherein the plant oil is at least one member selected from the group consisting of linseed oil, tung oil and soybean oil.

5. A aqueous pigment paste for an offset ink according to claim 2, wherein the solvent is at least one member selected from the group consisting of n-paraffin, isoparaffin, aromatic, naphthene and α-olefin.

6. A process for the production of a aqueous pigment paste for an offset ink, which comprises the steps of coupling a diazonium salt of an aromatic amine having a soluble group and a coupler component to obtain an azo dye, lake-forming the obtained azo dye in the presence of a rosin to obtain a slurry of a monoazo lake pigment, adding a vehicle for an offset ink to the obtained slurry of a monoazo lake pigment, and concentrating the slurry of a monoazo lake pigment obtained in the preceding step to produce the aqueous pigment paste for an offset ink.

7. A process for the production of a aqueous pigment paste for an offset ink, according to claim 6, wherein the vehicle for an offset ink is a vehicle further diluted with a solvent.

8. A process for the production of a aqueous pigment paste for an offset ink, according to claim 6, wherein the monoazo lake pigment is concentrated by filtering.

* * * * *